July 27, 1926.
J. J. CURTIS
TRAP
Filed May 29, 1925
1,593,693
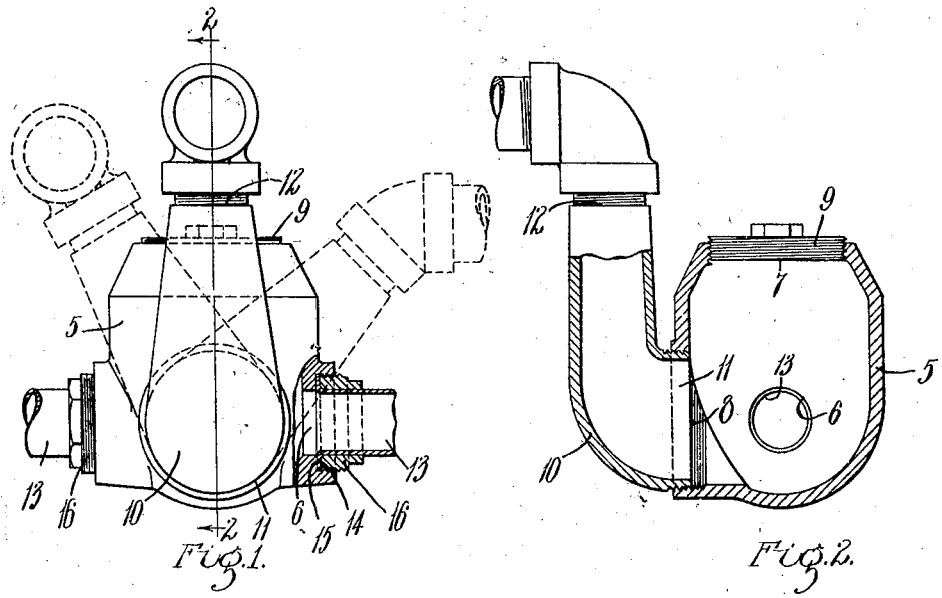
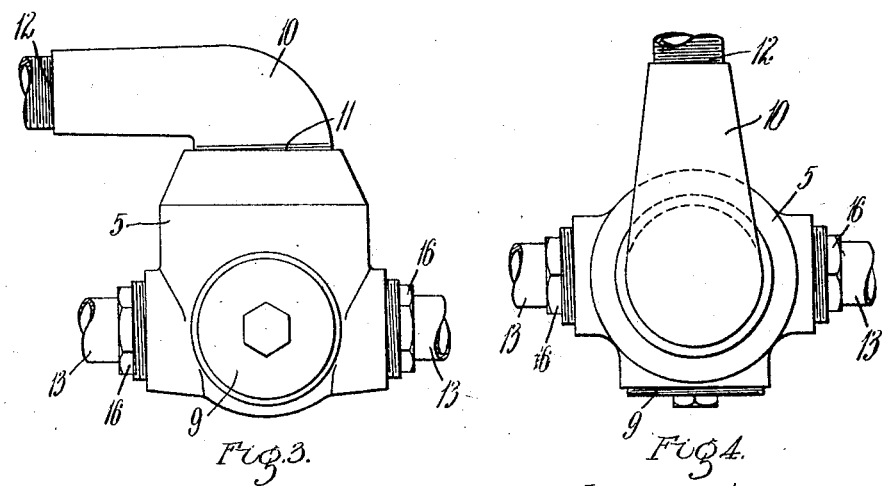
Inventor:
Jeremiah J. Curtis.
by Charles L. Gooding
att'y.

Patented July 27, 1926.

1,593,693

UNITED STATES PATENT OFFICE.

JEREMIAH J. CURTIS, OF WOLLASTON, MASSACHUSETTS.

TRAP.

Application filed May 29, 1925. Serial No. 33,805.

This invention relates to a trap particularly adapted to be used in connection with sinks, wash bowls, bath tubs and the like, and has for its object to provide a trap of the character set forth and provided with a clean-out cover and discharge elbow that may be interchanged one for the other, the discharge elbow also being adapted to be swung to different positions relatively to the body portion of the trap, thereby making it possible to install the trap in different positions and within limited areas, make the necessary piping connections thereto, and always have the clean-out cover accessible.

The invention consists in a trap constructed as set forth in the following specification and particularly as pointed out in the claim thereof.

Referring to the drawings:—

Figure 1 represents a front elevation of one form of trap embodying my invention, a portion of the same being broken away and illustrated in section.

Fig. 2 is a vertical section partly in elevation taken on the line 2—2 of Fig. 1.

Fig. 3 is a front elevation of the trap, but illustrating the clean-out cover and discharge elbow interchanged one for the other.

Fig. 4 is a plan view of the form of trap appearing in Fig. 3, but illustrating the discharge elbow swung into a position at right angles to that illustrated in said Fig. 3.

Like numerals refer to like parts throughout the several views of the drawings.

In the drawings, 5 is a body portion of a trap preferably formed of cast iron and having oppositely disposed inlet ports 6, and screw-threaded openings 7 and 8, said openings being located in planes perpendicular to each other. In the arrangement of the device illustrated in Figs. 1 and 2, the opening 7 is closed by a clean-out cover 9 which has screw-threaded engagement therewith, and the opening 8 has a discharge elbow 10 located therein, the interior of said elbow communicating with the interior of the body portion 5. The elbow 10 tapers from an entrance end 11 thereof toward a discharge end 12. The exterior of the discharge elbow 10 at the entrance end thereof is screw-threaded, said screw thread being the same size as the screw thread provided upon the periphery of the clean-out cover 9, and said discharge elbow 10 and cover 9 may, therefore, be interchanged as may be desired in the openings 7 and 8 in order that the trap may be used in different positions.

In Figs. 1 and 2 the trap is illustrated with the clean-out cover 9 located at the top thereof, while the discharge elbow 10 protrudes from the front of the trap adjacent to the bottom thereof, and then projects upwardly. When the trap is located in this position, the discharge elbow 10 may be swung to either side of a vertical plane represented by the line 2—2 as illustrated in the dotted line positions in Fig. 1.

In Figs. 3 and 4 the body portion of the trap is located in such a position that the clean-out cover 9 is at the front thereof and adjacent to the bottom thereof, while the discharge elbow 10 projects from the top of the trap and from said top the elbow may extend in any horizontal direction desired.

Inlet pipes 13, preferably formed of lead, connect with the body portion 5 of the trap at the inlet ports 6, each of said pipes having an exterior annular flange 14 at its end which bears against an interior annular flange 15 on the body portion 5, said interior annular flange surrounding the inlet port, and the flange 14 of the inlet pipe 13 is held securely clamped against the flange 15 by a bushing 16 which has screw-threaded engagement with said body portion 5.

While the trap of this invention is illustrated as being provided with two inlet ports 6, each of which has an inlet pipe 13 connected thereto, it is evident that any number of inlet ports may be provided as may be desired.

By constructing a trap as hereinbefore described with a clean-out cover 9 and a discharge elbow 10 which may be interchanged one for the other it is evident that the trap may be used in different positions, being placed in small areas between partitions, beneath floors and in limited spaces directly beneath wash tubs, or other plumbing apparatus for which they are provided, the clean-out cover at all times being easily accessible, and the pipe connections being easily installed.

I claim: —

A trap comprising, in combination, a hollow body portion provided with an inlet port and with discharge and clean-out openings, said openings being located in planes perpendicular to each other, a removable discharge elbow and a removable clean-out cover, said elbow and cover being interchangeable in said openings.

In testimony whereof I have hereunto set my hand.

JEREMIAH J. CURTIS.